(12) United States Patent
Metzger et al.

(10) Patent No.: US 10,914,695 B2
(45) Date of Patent: Feb. 9, 2021

(54) METHOD FOR ANALYZING PARTICLE ACCUMULATION ON A FILTER MEMBRANE

(71) Applicant: JOMESA Meβsysteme GmbH, Ismaning (DE)

(72) Inventors: Johann Metzger, Ismaning (DE); Jörn Lepelmeier, Ismaning (DE); James Ju, Ismaning (DE)

(73) Assignee: JOMESA MESSYSTEME GMBH, Ismaning (DE)

( * ) Notice: Subject to any disclaimer, the term of this patent is extended or adjusted under 35 U.S.C. 154(b) by 0 days.

(21) Appl. No.: 16/787,583

(22) Filed: Feb. 11, 2020

(65) Prior Publication Data

US 2020/0256812 A1    Aug. 13, 2020

(30) Foreign Application Priority Data

Feb. 13, 2019 (DE) .......................... 10 2019 103 551

(51) Int. Cl.
*G01N 23/00* (2006.01)
*G01N 23/2252* (2018.01)
(Continued)

(52) U.S. Cl.
CPC ......... *G01N 23/2252* (2013.01); *B01D 65/10* (2013.01); *G01N 15/0806* (2013.01);
(Continued)

(58) Field of Classification Search
CPC ........... G01N 23/2252; G01N 23/2202; G01N 15/0806; G01N 2015/084;
(Continued)

(56) References Cited

U.S. PATENT DOCUMENTS 7,016,034 B2    3/2006  Holz et al.
7,660,036 B2    2/2010  Metzger
(Continued)

FOREIGN PATENT DOCUMENTS

DE    202005020273 U1    3/2006
DE    102008035770 A1    2/2010
(Continued)

OTHER PUBLICATIONS

Office Action dated Nov. 20, 2019 in DE Application No. DE 10 2019 103 551.1.

*Primary Examiner* — Michael Maskell
(74) *Attorney, Agent, or Firm* — Panitch Schwarze Belisario & Nadel LLP (57) ABSTRACT

Methods for analyzing an accumulation of particles on a filter membrane involve analyzing comprise the particle accumulation in an optical analysis system using a light microscope, and then analyzing the particle accumulation in an SEM-EDX analysis system using a scanning electron microscope and energy-dispersive X-ray spectroscopy. In order to simplify and accelerate the testing of the filter membrane both in the optical analysis system and in the SEM-EDX system, the filter membrane is subject to a preparation which includes: (i) fixing the particles to the filter membrane, (ii) coating the particle accumulation with an electrically conductive coating which is produced from a conductivity solution that contains an ionic liquid, and (iii) holding the filter membrane flat or pulling the filter membrane taut.

17 Claims, 3 Drawing Sheets

(51) Int. Cl.
*B01D 65/10* (2006.01)
*G01N 23/2202* (2018.01)
*G02B 21/00* (2006.01)
*G01N 15/08* (2006.01)

(52) U.S. Cl.
CPC ......... *G01N 23/2202* (2013.01); *G02B 21/00* (2013.01); *G01N 2015/084* (2013.01); *G01N 2223/076* (2013.01)

(58) Field of Classification Search
CPC ..... G01N 2223/076; G01N 2223/1016; G01N 23/20091; G01N 15/0606; B01D 65/10; G02B 21/00; H01J 37/26
USPC .................... 250/306, 307, 310, 311, 440.11
See application file for complete search history.

(56) References Cited

U.S. PATENT DOCUMENTS

| | | | |
|---|---|---|---|
| 2011/0057100 A1* | 3/2011 | Nakazawa | G01N 23/04 250/307 |
| 2011/0311996 A1 | 12/2011 | Friedberger et al. | |
| 2015/0211976 A1 | 7/2015 | David et al. | |
| 2016/0126058 A1* | 5/2016 | Ominami | H01J 37/10 250/307 |

FOREIGN PATENT DOCUMENTS

| | | | |
|---|---|---|---|
| WO | 2002097400 A1 | 12/2002 | |
| WO | 2014057009 A1 | 4/2014 | |

\* cited by examiner

METHOD FOR ANALYZING PARTICLE ACCUMULATION ON A FILTER MEMBRANE

CROSS-REFERENCE TO RELATED APPLICATIONS

This application claims priority under 35 U.S.C. § 119(b) to German Application No. 10 2019 103 551.1, filed Feb. 13, 2019, the disclosure of which is incorporated herein by reference in its entirety.

BACKGROUND OF THE INVENTION

Technical Field

The present invention relates to a method for analyzing an accumulation of particles on a filter membrane, comprising the analyzing steps of:
(a) analyzing the particle accumulation in an optical analysis system using a light microscope, and then
(b) analyzing the particle accumulation in an SEM-EDX analysis system using a scanning electron microscope by energy-dispersive X-ray spectroscopy.

Prior Art

When determining the technical cleanliness, the surfaces of technical components or units, for example machine elements, are washed with a solvent and dirt particles adhered thereto are washed away. The washing solution is then filtered and the particles are deposited on a filter membrane. The analysis and evaluation of the particles are carried out by frequency, size, shape or material by means of tests using electron microscopy or light microscopy and make it possible to draw conclusions on the manufacturing quality and any discrepancies in the manufacturing process of the technical component or unit.

The quantitative counting and measurement of the particles on the filter membrane are frequently carried out using optical microscopes and generally also provide a simple, qualitative differentiation between metal and non-metal particles. However, to do this, this test requires a non-metal background, on which the particles are placed during the analysis. PET-based or polyamide-based filter membranes are usually used as the non-metal background.

Owing to increased requirements, more precise material analysis is increasingly additionally being required, which is often carried out by SEM-EDX (SEM—scanning electron microscopy, EDX or EDS (energy-dispersive X-ray spectroscopy)). An SEM-EDX analysis provides comprehensive structural information as well as the ratios of the chemical elements. In this process, the atoms in the particle sample are excited by an electron beam having a specific energy level, such that the atoms emit X-ray radiation that is characteristic of the chemical element in question.

This can result in problems if the particles to be tested are placed on an electrically non-conductive substrate, for example a filter membrane. This is because due to the electrical charge of the substrate and the particles, there is both the risk that particles move or fly off in an uncontrolled manner and that electromagnetic fields deflect the electron beam. In addition, spontaneous discharges of the substrate and particles may occur, resulting in temporary signal flooding of the imaging detectors. This occurs in particular in SEM-EDX analyses, since, for this purpose, electrons have to be fired at the particles for a relatively long time and in a focused manner in order to obtain sufficiently high count rates for the SEM-EDX spectrum.

Technical Statement of the Problem

Ideally, the same substrate (referred to in the following as the "filter" or "filter membrane") is tested both in the optical analysis system and in the SEM-EDX system, with the software using the results of the optical analysis for the selective particle analysis in the SEM-EDX system. The SEM-EDX analysis is, however, more complex and slower than the optical analysis and in this respect determines the processing duration and execution rate, and this has a negative impact in series testing in particular. Therefore, there is a need to accelerate the analysis process in the SEM-EDX system.

The problem addressed by the present invention is to provide a method that allows the analysis to be carried out in the SEM-EDX system reliably and rapidly, such that, in particular, the testing of the same filter membrane is simplified and accelerated both in the optical analysis system and in the SEM-EDX system.

BRIEF SUMMARY OF THE INVENTION

Proceeding from a method of the type mentioned at the outset, this problem is solved according to the invention by a preparation of the filter membrane before analyzing step (a) and/or before analyzing step (b), which comprises the following preparation measures:
i. fixing the particles to the filter membrane before analyzing step (a),
ii. coating the particle accumulation with an electrically conductive mass, which is produced from a conductivity solution that contains an ionic liquid, and
iii. holding the filter membrane flat or pulling the filter membrane taut.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

In the drawings.

DETAILED DESCRIPTION OF THE INVENTION

The invention relates to a filter preparation which is optimized with respect to testing of the same filter membrane both in the optical analysis system and in the SEM- EDX system such that in particular the test in the SEM-EDX system runs reliably but still rapidly.

A first aspect of the invention is thus considered that of simplifying and accelerating the analysis in the SEM-EDX system using an optimized preparation of the filter membrane, in order to also improve the coordination and synergy of optical analysis and SEM-EDX analysis as a result.

Another aspect of the invention aims to achieve the sought optimized preparation of the filter membrane by avoiding or reducing at least some of the above-mentioned problems and, in particular by the following main requirements (1) to (3) on the filter membrane being met:

(1) In order to ensure reliable and rapid analysis, the particle accumulation must be fixed to the filter membrane before each analyzing step (a) and (b). In particular, particles should not fly off in an uncontrolled manner due to charge in the SEM-EDX system. Furthermore, when transporting the filter membrane from the optical system to the SEM-EDX system, it must be ensured that the position or situation of the particles does not change. This is a particular problem for large particles having diameters of greater than 500 μm, for example.

It is known to fix the particle accumulation using a fixing mass for this purpose; however, the fixing mass must not be visible in an interfering manner either in the optical imaging or in the SEM-EDX imaging. The fixing mass should not cover the particles as far as possible, since otherwise the SEM-EDX analysis of the particle type is rendered difficult or impossible.

(2) In order to ensure reliable and rapid SEM-EDX analysis, an electrical charge of the filter membrane and particle accumulation must be prevented as much as possible. To reduce electrical charge, it is known to cover the entire surface of the particle accumulation on the filter membrane with gold or carbon. Using this covering, however, both the distinction between metal and non-metal in the optical analysis and the material-specific testing of the particles in the SEM-EDX analysis EDX system is rendered difficult.

(3) In order to ensure reliable and rapid analysis, the filter membrane must be sufficiently planar due to the limited depth of focus.

Known methods such as placing glass covers thereon or fixing the membrane in a membrane filter holder having a glass cover are not possible, since glass covers are not permeable to the electron beam in the SEM-EDX.

In preferred approaches, the preparation of the filter membrane also meets the following secondary requirements (4) to (6):

(4) In order to ensure rapid and reliable analysis, it should be possible for the positions on the surface of the filter membrane to be found and approached in a reproducible manner. Markers are suitable for this purpose in order to make it possible to synchronize and coordinate the optical analysis and the SEM-EDX analysis. It must be possible to detect the marker both in the optical microscope and in the SEM. As a result, simple colored imprints are not possible.

(5) In order to ensure reliable analysis, it should be possible for the filter membrane to be stored so as to be protected from contamination after the optical analysis until the analysis in the SEM-EDX system.

(6) In order to ensure that the analysis result can be repeated and checked, it should be possible to archive the filter membrane on which measurement has been completed.

Fixing the Particle Accumulation

The particle accumulation is fixed to the filter membrane according to preparation measure (i) before analyzing step (a), a fixing mass preferably being deposited between the particles and the filter membrane. This fixing mass connects the particles to the upper side of the filter membrane.

Here, the fixing mass is preferably produced from a liquid fixing solution with which the filter membrane is infiltrated. It has proven advantageous for the contact between the particles and filter membrane to be made from the underside of the filter membrane through the pores thereof. As a result, the particles can be particularly simply prevented from being washed away by the fixing solution. In the process, the filter membrane can be infiltrated by the liquid fixing solution being brought into contact with the underside of the filter membrane such that it is transported by capillary forces through the pores in the filter membrane to the upper side and, here, additionally wets the particles supported thereon in the lower particle region due to the surface tension. In another preferred method, the fixing solution is brought into contact with the upper side of the filter membrane, from which point it is distributed through the entire filter membrane and wets the particles due to capillary forces and surface tension. Here, the fixing solution is preferably applied to a region of the upper side of the filter membrane that is outside the particle accumulation or is not relevant to the subsequent analysis steps.

After solidifying the fixing solution, for example by evaporating a solvent or dilution agent and/or by polymerization, a solid fixing mass results which adheres the particles to the filter membrane.

In a particularly advantageous variant of the method, the fixing solution contains polymethyl methacrylate (PMMA) and/or contains methyl methacrylate (MMA) as a precursor substance therefor.

Where appropriate, polymerized PMMA is present in the fixing solution in fully or partially dissolved form. Suitable solvents are, for example, nitromethylene chloride, methylene chloride, nitroethane, ethyl formate or ethyl acetate. For the formation of a low-viscosity fixing solution, it is advantageous for the PMMA macromolecules present to be short-chained (50 k) and/or for a fraction of monomers to additionally be present in the fixing solution.

The method is designed to be particularly simple if the fixing solution contains the monomer molecule as a precursor substance for PMMA, i.e. monomer methyl methacrylate (MMA). Where appropriate, acetone is particularly suitable as a solvent or dilution agent, and this has the advantage of it being possible for acetone to be evaporated or vaporized simply and rapidly without any major environmental or health risks. The boiling point of acetone is 56° C. When evaporating/vaporizing acetone, constituents of the fixing solution, in particular smaller molecules, such as short-chained monomers, e.g. MMA, can also be transported through the pores to the upper side of the substrate.

The fixing mass that forms hereby consists fully or predominantly of polymerized PMMA, which ensures good adhesion of the particles to the substrate and barely impairs, or does not impair, the optical analysis of the particle accumulation or an SEM-EDX analysis due to its transparency, especially since the fixing mass does not cover the particles to be analyzed, or at least does not cover the particles to any substantial extent.

Coating the Particle Accumulation with a Conductive Coating

The electrically conductive coating on the particle accumulation is produced using a conductivity solution that contains an ionic liquid.

The conductivity solution and thus also the ionic liquid should not contain any elements other than carbon, nitrogen, oxygen and hydrogen, in order to prevent any distortion of the EDX spectra. A suitable and preferred example of a suitable ionic liquid is 1-ethyl-3-methylimidazolium acetate (CAS No.: 143314-17-4).

To apply the conductivity solution, the ionic liquid is diluted with a dilution agent, the dilution ratio being in volume fractions of at least 1:5, preferably at least 1:20. The dilution agent preferably contains ethanol. Strong dilution ensures homogeneous distribution of the components of the conductivity solution on the filter membrane filled with particles, such that, once the dilution agent has evaporated, a conductive layer of ionic liquid that is as thin as possible but largely closed is obtained. Very thick layers could result in distortion of the SEM images.

The ionic liquid is applied to the filter membrane before or after the optical analysis. Ionic liquids may change over time in the presence of oxygen, and therefore a reduction in electrical conductivity and discoloration may occur, which impair the optical analysis. The use of filter membranes that are adjusted in color depending on the discoloration (for example yellow filter membranes) can minimize this drawback in the optical analysis. Preferably, the ionic liquid is, however, applied to the filter membrane just before the SEM-EDX analysis.

The filter membrane being brought into contact with the diluted ionic liquid, for example by the liquid being dropped over the upper side of the filter membrane, does not result in the particles being washed away, in particular not if the filter membrane has been previously treated with a fixing solution according to preparation measure (i) such that the particles are adhered to the filter membrane from below. This results in the preferred sequential order of the preparation measures (i) and (ii) and in particular that the particle accumulation is coated according to preparation measure (ii), preferably between analyzing steps (a) and (b).

Once the solvent and/or dilution agent, for example ethanol, has evaporated, only a thin layer of ionic liquid remains on the filter membrane. The electrically conductive layer does not impair the optical properties of the filter membrane, nor is the EDX spectrum distorted by introducing additional elements.

Holding the Filter Membrane Flat or Pulling Said Filter Membrane Taut

Planar filter membrane surfaces are important for analyzing steps (a) and (b), in particular if the test apparatus has a low depth of focus.

In a preferred approach, for holding the filter membrane flat or pulling said filter membrane taut, according to preparation measure (iii) the filter membrane is placed onto a planar, adhesive mat and/or is stretched in a tensioning device, for example in a drum tensioner.

This measure always takes place before analyzing step (b), and preferably in analyzing step (a), either (aa) before the filter membrane is brought into contact with the liquid fixing solution or (bb) just after the filter membrane has been brought into contact with the liquid fixing solution and has not yet fully dried.

In the case of (aa), the fixing solution is applied to the adhesive mat such that it penetrates the filter membrane, including the region of the particle accumulation, due to capillary action and surface tension.

In the case of (bb), the filter membrane still infiltrated with liquid fixing solution is placed onto the adhesive mat or is tensioned in the tensioning device, such that the solvent or dilution agent is entirely removed with the filter membrane being tensioned flat.

In both cases (aa) and (bb), the solvent or dilution agent is entirely removed with the filter membrane being placed or tensioned flat and still being moist in any case, which contributes to preventing any warping and formation of undulations.

In addition, the solvent or dilution agent, such as acetone, vaporizes/evaporates more rapidly in the tensioned state.

The mat consists of a double-sided adhesive film, for example; however, a mat that contains paper or consists thereof has proven to be particularly advantageous.

To carry out analyzing steps (a) and (b), the filter membrane can be inserted into a membrane filter holder together with the planar, adhesive mat.

Marker, Protection, Storage

In order to coordinate analyzing steps (a) and (b) and to locate predetermined positions on the surface of the filter membrane in a reproducible manner, at least one position marker can be applied to the above-mentioned adhesive mat for holding the filter membrane flat or pulling the filter membrane taut according to preparation measure (iii) and/or to the above-mentioned membrane filter holder. Third mat for the filter membrane is preferably provided with at least one position marker.

The position marker serves to coordinate analyzing steps (a) and (b) and to locate predetermined positions on the surface of the filter membrane in a reproducible manner. The position marker is advantageously permanent and can be detected both in the optical microscope system and in the SEM-EDX system; for example, it consists of a metal-coated adhesive film, preferably made of a small, thin copper plate that may have a hole therein (what is known as a "TEM grid"). For improved orientation when positioning the filter membrane, a printed circle is advantageous so that the filter membrane can be positioned approximately in the center. The coordinates of the position marker are detected and stored by the evaluation software.

The above-mentioned membrane filter holder for receiving the filter membrane when carrying out analyzing steps (a) and (b) is preferably made of plastic material and is provided with a closure in the form of a removable glass cover. The closed glass cover protects the filter against contamination.

In order to prevent any contact between the glass cover and the particle accumulation on the filter membrane, the membrane filter holder is provided with a spacer that may be designed as a raised, peripheral edge, for example.

Components of a machine element are treated with a washing solution as part of the residual dirt analysis and the particle-containing washing solution is removed via a filter membrane.

In a first embodiment, a commercially available, closed-mesh, screen-fabric filter that has a filter diameter of 47 μm and is made of acetone-stable PET material (polyethylene terephthalate) (JOMESA; trade name: PE-47L-5) is used as the filter membrane. The particles contained in the washing solution are deposited on the upper side of the filter membrane.

Figure 1:
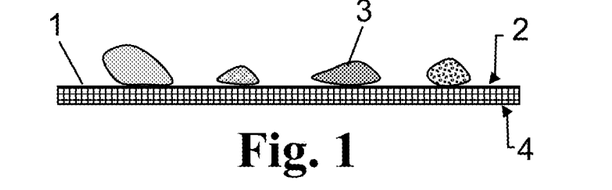
FIGS. 1 to 7 are schematic views of method steps for the preparation of a filter medium for the microscopic analysis and the SEM-EDX analysis.

FIG. 1 schematically shows the filter membrane 1 and particles 3 accumulated on the upper side 2 thereof. This view and the following schematic views are not true to scale, for reasons of presentation.

The filter membrane 1 is then prepared for an analysis by light microscopy. This preparation includes a preparation measure for fixing the particles 3 to the filter membrane 1. The fixing is carried out by a fixing mass 5 (FIG. 3) being produced between the particles 3 and the upper side 2 of the filter membrane 1. The fixing mass 5 can be produced in various ways.

Figure 2:
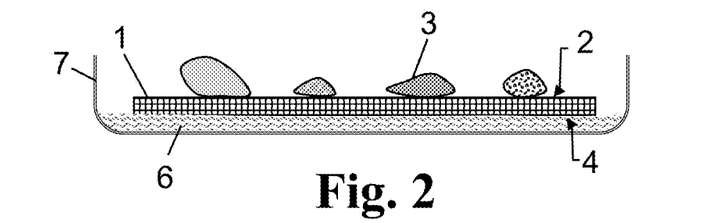

FIG. 2 schematically shows a first approach, in which the fixing mass or a precursor substance therefor is applied through the filter membrane pores from the underside 4 of the filter membrane 1. In the embodiment, for this purpose, a thin fixing solution 6 which contains the acrylic adhesive (methyl methacrylate MMA) and acetone as the solvent or dilution agent is added to a Petri dish 7 and the filter membrane 1 to be tested is placed onto the fixing solution 6. 2 ml fixing solution is sufficient for the filter membrane having a 47 mm diameter.

The fixing solution and components contained therein reach the upper side 2 of the filter membrane 1 through the pores from the underside 4 due to capillary force and, here, come into contact with the surfaces of the particles which are in contact with the filter membrane 1. Owing to capillary force and surface tension, the fixing solution 6 is drawn a little way upwards on particle surfaces. The dilution agent and solvent acetone evaporates under standard conditions (room temperature: 25° C., atmospheric pressure 1013 hPa). In the process, the MMA begins to polymerize and a fixing mass 5 forms that fixes the particles 3 to the filter membrane 1, as shown schematically in FIG. 3.

After approximately 1 minute, the impregnated filter membrane 1 is placed onto an adhesive paper mat (FIG. 4, reference sign 9), which tensions the filter membrane 1. In this tensioned state, the remaining acetone evaporates and a structure of polymerized MMA (PMMA) forms below and in the lower region of the particles 3, which adheres the particles to the filter membrane 1. The volume of the fixing mass is thus substantially restricted to the region of contact surfaces between the particles 3 and the upper side 2 of the filter membrane. The paper mat 9 prevents the filter membrane 1 from warping or becoming undulated. For further processing, the dried filter membrane 1 is inserted into a membrane filter holder, which is explained in greater detail below with reference to FIG. 5.

Figure 4:
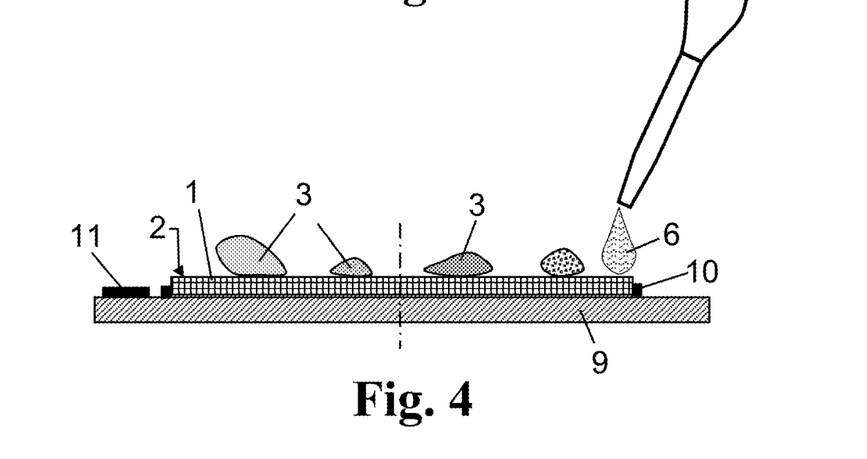

FIG. 4 schematically shows another approach, in which the fixing mass or a precursor substance therefor is applied to the upper side 2 of the filter membrane 1. In this process, the filter membrane 1 is first adhered to a paper mat 9 and the fixing solution 6 is dropped thereon until it has been distributed through the pores of the filter membrane 1 to the extent that the entire particle accumulation is wetted. The fixing solution 6 is preferably dropped on at a point on the upper side 2 of the filter membrane that does not contain any particles or is not required for the subsequent analysis. The paper mat 9 is explained in greater detail below with reference to FIG. 5.

Figure 3:
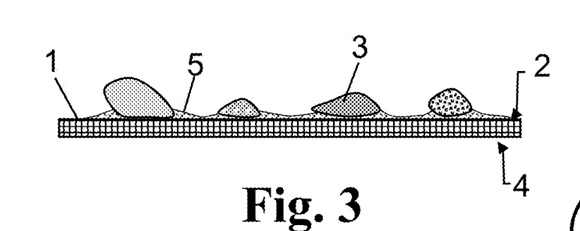

When evaporating the dilution agent and solvent acetone, the MMA begins to polymerize and the fixing mass 5 forms between the particles 3 and the filter membrane 1, as shown schematically in FIG. 3.

Figure 5:
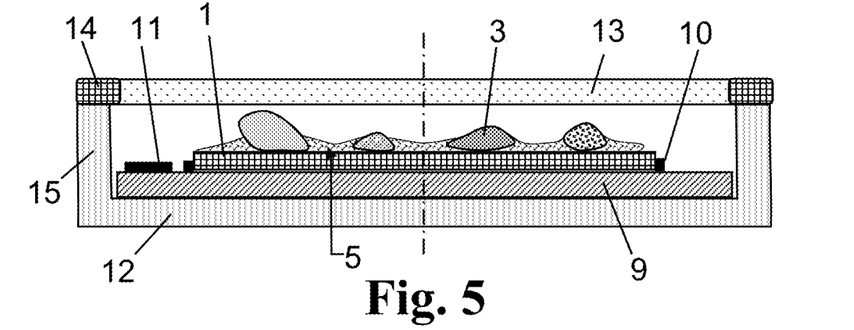

FIG. 5 shows the filter membrane 1 together with the paper mat 3 inserted into a membrane filter holder 12 made of plastics material.

The paper mat 9 is preferably coated on both sides with a vacuum-compatible adhesive. For the purposes of orientation, a plurality of markers are made on the adhesive paper mat 9; a circle 10 makes it easier to position the filter membrane 1 in the center and a dot 11 denotes a defined circumferential position (the circle 10 and the dot 11 are more clearly visible in FIGS. 8 and 9). The position marker 11 consists of a small, thin copper plate having a diameter of 3 mm and a central hole having a diameter of 100 μm, and can be detected both in the optical microscope system and in the SEM-EDX system. The small copper plate 11 also has the advantage that it can be used to carry out or test the calibration of the EDX detector before each measurement.

The membrane filter holder 12 can be closed by a removable, framed glass cover 13 (mount 14). Direct contact between the glass cover 13 and the filter membrane 1 and the particles 3 to be analyzed that are positioned thereon is ensured by a spacer 15, which extends over the edge of the membrane filter holder 12 (the membrane filter holder 12 is equipped with a raised, peripheral outer edge). The glass cover 13 is clipped onto the spacer 15. As a result, the filter membrane 1 is protected against any further contamination.

The plastic membrane filter holder 12 can become undulated after acetone evaporates from the fixing solution 6. It has been found that the paper mat 9 can also prevent the undulation of the membrane filter holder 12.

The filter membrane 1 is then inserted in an optical microscope system. The protective glass of the glass cover 13 is selected such that it does not change the polarization state of the observation light and the optical analysis is not affected in dark-field illumination. In this analysis, the size distribution is determined by counting and measuring the particles. In general, the qualitative distinction between metal and non-metal particles or into fibrous particles is also made.

Figure 10:
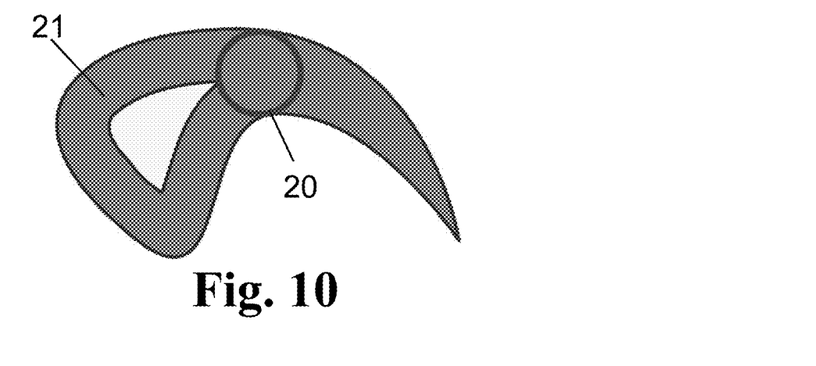
FIG. 10 is an outline for explaining the determination of the incircle of a particle.

For the subsequent analysis in the SEM-EDX, the surface incircle can also be calculated and the coordinates thereof can be determined for each particle 3 to be analyzed. The surface incircle of a particle is defined as the largest circle that lies completely within the particle contour and solely encloses the particle surface. FIG. 10 shows an example of an incircle 20 in a particle 21 having a complex shape. The method for calculating the surface incircle is described in VDA [German Association of the Automotive Industry], volume 19, part 1: "Inspection of Technical Cleanliness—Particulate Contamination of Functionally Relevant Automotive Components", 2nd revised edition, March 2015.

The coordinates of this circle are used in the SEM-EDX software, since the EDX analysis is carried out at the midpoint of the surface incircle. This ensures that the EDX analysis always analyses the particles to be analyzed (and not the empty space that is potentially surrounded by the particle).

In order to prevent interfering charges in the high vacuum during the subsequent testing in the SEM-EDX system, the particle accumulation is provided with an electrically conductive coating. So as not to distort the chemical analysis, the coating should contain only the elements C, N, O and H as far as possible. Therefore, coatings containing boron or sulfur are less suitable. This because, during the particle analysis, particles made of abrasive materials often have to be identified which may consist of boron nitride, for example. Sulfur-containing substances are also often encountered in the industrial sector, such as in pigments that may contain sulfates.

Figure 6:
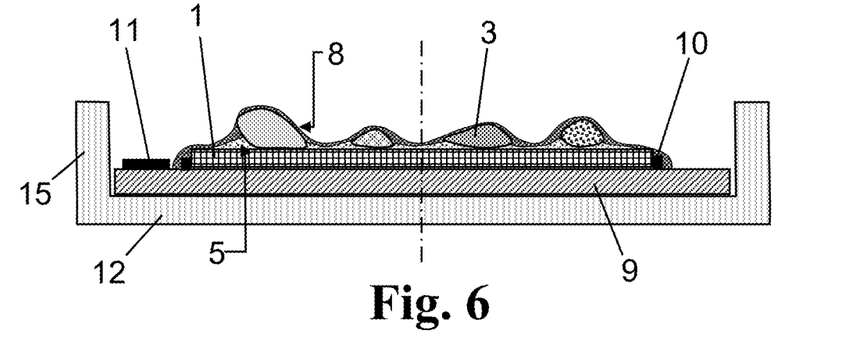
Figure 7:
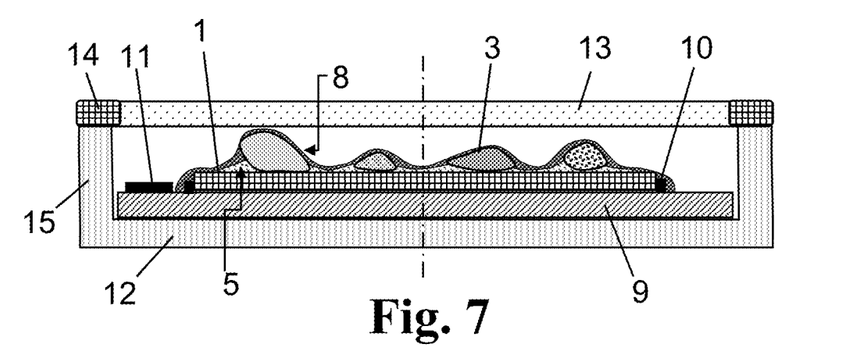

FIG. 6 schematically shows the electrically conductive coating 8. It is produced from an ionic liquid, which is applied to the particle accumulation in a dilution or solution. The application of the ionic liquid to the particle accumulation must not change the positions of the particles 3 fixed by the fixing mass 5. Therefore, acetone must not be used as the solvent or dilution agent under any circumstances. This is because acetone would re-dissolve or re-disperse the polymerized acrylates in the fixing mass 5 and thus disrupt the fixing of the particles. Therefore, only those agents that do not do this are possible for producing the dilution or solvent of the ionic liquid. In the embodiment, ethanol is used for producing the dilution or solvent of the ionic liquid.

In order for the SEM-EDX analysis to be disrupted as little as possible by the coating 8, the layer of ionic liquid should be as thin as possible. This can be achieved by a high degree of dilution, for example. It is also not necessary to provide charge dissipation (e.g. by continuous contact with the metal housing). For the particle analysis, it is sufficient for the electrical charge to distributed over the largest surface area possible. Typical filter membranes 1 have a diameter of 47 mm or 50 mm. In order to prevent or minimize interfering local charges, it is sufficient to distribute the electrical charge over this filter surface. It is not necessary to dissipate charge from the entire filter surface.

1-ethyl-3-methylimidazolium acetate that is highly diluted with ethanol is a suitable liquid for producing the coating. In the embodiment, a degree of dilution of 1-ethyl-3-methylimidazolium acetate to ethanol of 1:24 volume fractions is set.

This solution is dropped or sprayed over the filter membrane so as to cover the surface thereof. It is also possible to apply the ionic liquid before the optical analysis, but this does have drawbacks; the conductivity properties of the ionic liquid decrease over time. It also results in yellowing of the white filter, which can impact the optical analysis. The use of filters printed in color (for example yellow) can improve this; however, colored filters have the drawback that particles thereon that are the same color cannot be properly detected.

Once the ethanol has evaporated, the membrane filter holder is inserted into the SEM-EDX system without the glass cover 13. First, the position of the marker 11 is determined and, in this way, the particle positions are synchronized with the optical system. The material properties of all or some particles can then be determined. The EDX analyses are carried out at the midpoint of the surface incircle 20.

After the SEM-EDX analysis, the filter in the membrane filter holder 12 is closed again by the glass cover 13. In this way, it is cost-effectively archived and repeat measurements can be supplied.

Figure 8:
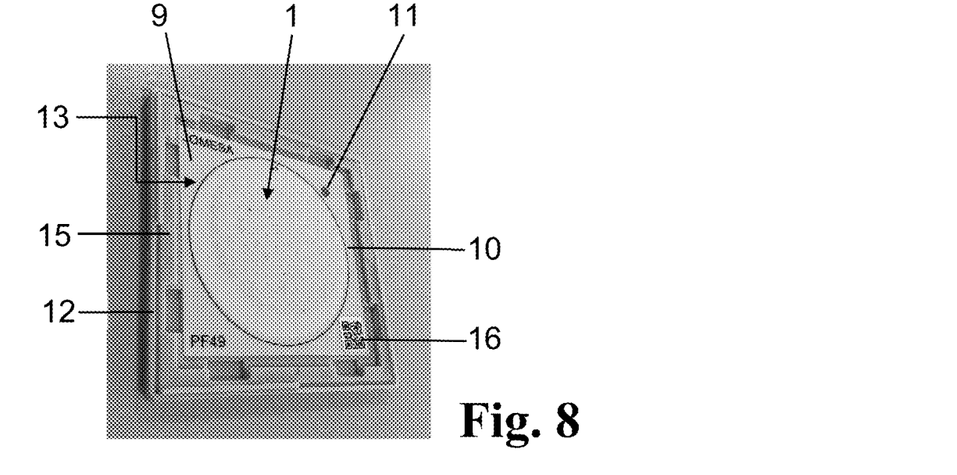
FIG. 8 is a photograph of a membrane filter holder having a filter membrane placed therein together with a filter mat.

The photograph in FIG. 8 shows the filter membrane 1, inserted into a membrane filter holder 12 made of plastics material, to the base of which a paper mat 9 is adhered which is coated on both sides with a vacuum-compatible adhesive. For the purposes of orientation, a plurality of markers are made on the paper mat 9; the printed circle 10 makes it easier to position the filter membrane 1 in the center and the dot 11 denotes a defined circumferential position. The position marker 11 consists of a small, thin copper plate as mentioned above, and can be detected both in the optical microscope system and in the SEM-EDX system. A barcode 16 is only used to make it easy to retrieve the filter.

Figure 9:
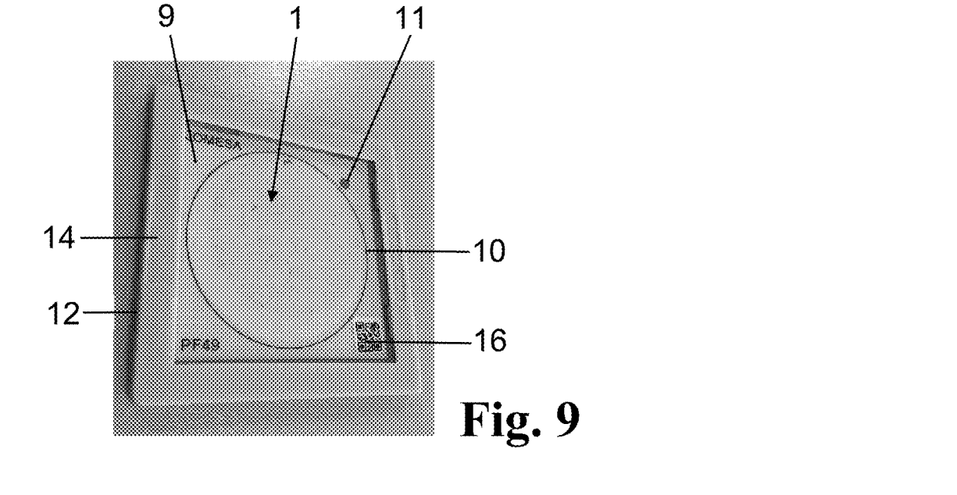
FIG. 9 is a photograph of the membrane filter holder from FIG. 8 with protective glass clipped thereto.

FIG. 9 shows that the membrane filter holder 12 can be closed by a removable and framed (mount 14) glass cover 13. Direct contact between the glass cover 13 and the filter membrane 1 and the particles to be analyzed that are positioned thereon is ensured by spacers 15 (FIG. 8 and FIG. 5), which are arranged over the edge of the membrane filter holder 12. The glass cover 13 is clipped onto the spacer 15. As a result, the filter membrane 1 is protected against any further contamination.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. A method for analyzing an accumulation of particles on a filter membrane, comprising the analyzing steps of:
    a) analyzing the particle accumulation in an optical analysis system using a light microscope, and then
    b) analyzing the particle accumulation in an SEM-EDX analysis system using a scanning electron microscope by energy-dispersive X-ray spectroscopy,
further comprising preparing the filter membrane before analyzing step (a) and/or before analyzing step (b), wherein the preparing comprises preparation measures (i), (ii), and (iii):
    i. fixing the particles to the filter membrane before analyzing step (a),
    ii. coating the particle accumulation with an electrically conductive coating which is produced from a conductivity solution containing an ionic liquid, and
    iii. holding the filter membrane flat or pulling the filter membrane taut.

2. The method according to claim 1, wherein the particles are fixed according to preparation measure (i) before analyzing step (a), wherein a fixing mass is deposited between the particles and the filter membrane.

3. The method according to claim 1, wherein the fixing mass is produced from a liquid fixing solution with which the filter membrane is infiltrated.

4. The method according to claim 1, wherein the fixing mass contains polymethyl methacrylate (PMMA) and/or contains methyl methacrylate (MMA) as a precursor substance therefor.

5. The method according to claim 1, wherein 1-ethyl-3-methylimidazolium acetate is used as the ionic liquid.

6. The method according to claim 1, wherein the conductivity solution contains the ionic liquid and a dilution agent, wherein the dilution ratio is in volume fractions at least 1:5.

7. The method according to claim 6, wherein the conductivity solution contains the ionic liquid and a dilution agent, wherein the dilution ratio is in volume fractions at least 1:20.

8. The method according to claim 6 wherein the dilution agent contains ethanol.

9. The method according to claim 1, wherein the particle accumulation is coated according to preparation measure (ii) between analyzing steps (a) and (b).

10. The method according to claim 1, wherein the filter membrane is placed onto a planar, adhesive mat and/or is stretched in a tensioning device- for holding the filter membrane flat or pulling the filter membrane taut according to preparation measure (iii).

11. The method according to claim 1, wherein the filter membrane is placed in a drum tensioner for holding the filter membrane flat or pulling the filter membrane taut, according to preparation measure (iii).

12. The method according to claim 3, wherein the filter membrane infiltrated with liquid fixing solution is placed onto the adhesive mat or is tensioned in the tensioning device.

13. The method according to claim 12, wherein the adhesive mat contains paper and is provided with at least one position marker.

14. The method according to claim 1, wherein the filter membrane is inserted in a membrane filter holder.

15. The method according to claim 14, wherein the membrane filter holder is made of plastics material and is provided with a closure in the form of a removable glass cover.

16. The method according to claim 1, wherein the filter membrane consists of a material that is stable towards acetone.

17. The method according to claim 1, wherein the filter membrane consists of polyethylene terephthalate (PET) or polyamide (PA).

* * * * *